Patented May 25, 1948

2,442,005

UNITED STATES PATENT OFFICE 2,442,005

METHOD OF MAKING SODIUM ASCORBATE

William A. Holland, Chicago, Ill.

No Drawing. Application August 23, 1945,
Serial No. 612,311

4 Claims. (Cl. 260—344.5)

This invention relates to the preparation of the dry alkali metal salt of ascorbic acid.

Ascorbic acid, which is the active ingredient in vitamin C, is used in many preparations for its therapeutic value. Because of its high acidity it cannot be administered by injection, however, and the salts of ascorbic acid which can be injected are unstable when in solution. I have invented a method of making the alkali metal salt of ascorbic acid, such as the sodium salt, wherein the salt can be prepared dry and stored until needed. The alkali metal ascorbate may be made very pure, as there are no by-products formed which must be separated from the salt.

In preparing the dry sodium salt of ascorbic acid the acid is dissolved in water, and a water soluble alkaline salt, such as the hydroxide and the carbonates of an alkali metal, is added to the solution. After a period of agitation a solvent that will dissolve water, but will not dissolve the sodium ascorbate, is added to the solution. The alkali metal ascorbate precipitates out of the solution. The precipitate is then filtered and washed with a small amount of the solvent and dried out of contact with air.

In a specific embodiment of my invention 4.4 gms. of ascorbic acid is dissolved in 4 cc. of distilled water. To this solution is added 2.1 gms. of sodium bicarbonate, and the solution agitated. After a few minutes 20 cc. of substantially anhydrous isopropanol is added, and the mixture agitated. The isopropanol dissolves water, but will not dissolve the sodium ascorbate. The precipitated sodium ascorbate is permitted to settle, the supernatent liquid is poured off, and 20 cc. more isopropanol is added; the mixture is thoroughly stirred, and the solid sodium ascorbate is filtered. 10 cc. of additional isopropanol is used to wash the sodium ascorbate, and the salt is then dried out of contact with air such as a vacuum or in an inert atmosphere. The entire preparation takes from 20 to 25 minutes, exclusively of drying, with the preparation being performed at room temperature, such as 70° F., or lower.

While the reaction by the ascorbic acid and the alkali is taking place an inert atmosphere is preferably maintained over the reacting solution. When carbon dioxide is used as the inert atmosphere it may be supplied from an outside source, solid carbon dioxide may be put in the solution, or it may be generated within the reacting solution when an alkali carbonate, such as the sodium bicarbonate, is used as one of the reacting materials. Solid carbon dioxide has an advantage in that it also serves as a cooling agent. Any water soluble alkaline sodium compound whose anion does not leave a residue may be used in the reaction, and includes such compounds as sodium carbonate, sodium hydroxide, sodium bicarbonate, and the like. The carbonate and bicarbonate serve a dual purpose in that they supply the sodium ion to the reaction and also cause an atmosphere of carbon dioxide to be maintained over the solution. Sodium bicarbonate is the preferred material as it has a negative heat of solution and this cools the solution.

Any substantially anhydrous solvent may be used in this method so long as it has an affinity for and will dissolve water, but it will not dissolve the sodium ascorbate. These solvents include isopropanol, methyl alcohol, ethyl alcohol, propyl alcohol, butyl alcohol, amyl alcohol, benzyl alcohol, dioxane, acetone, ethyl acetate, ethyl formate, other acetates and formates of alcohols, ethyl lactate, propyl lactate, ethyl levulinate, ethyl citrate, ethyl tartrate, and the like. All aliphatic alcohols, up to and including those having five carbon atoms, are good solvents.

The above method of preparing sodium ascorbate produces a material that is practically 100% pure, as determined by tritration with iodine. There are no by-products formed in the reaction that need to be separated out.

While the alkali metal ascorbate is being dried it is kept out of contact with air. This may be done by drying in a vacuum or in an inert atmosphere.

Having described my invention together with a typical embodiment of the same, it is my intention that the invention be not limited by details of description, but rather be construed broadly within its spirit and scope as set out in the accompanying claims.

I claim:

1. The method of preparing the dry alkali metal salt of ascorbic acid which comprises dissolving the acid in water, adding an alkali metal bicarbonate, adding a substantially anhydrous aliphatic alcohol containing not more than five carbon atoms in the aliphatic radical, filtering, and drying in the substantial absence of air, the entire process taking place at a temperature not substantially above room temperature.

2. The method of claim 1 wherein the bicarbonate is sodium bicarbonate.

3. The method of claim 1 wherein the solvent is isopropanol.

4. The method of preparing the dry sodium salt of ascorbic acid which comprises dissolving 4.4 parts of ascorbic acid in 4 parts of water, adding 2.1 parts of sodium bicarbonate, reacting the mixture to form a solution of sodium ascorbate, adding 20 parts of substantially anhydrous isopropanol, agitating, pouring off the supernatent liquid, adding 20 parts more of substantially anhydrous isopropanol, filtering the salt, washing with 10 parts of substantially anhydrous isopropanol, and drying the salt under vacuum, the entire process taking place at a temperature not substantially higher than room temperature.

WILLIAM A. HOLLAND.

REFERENCES CITED

The following references are of record in the file of this patent:

UNITED STATES PATENTS

| Number | Name | Date |
|---|---|---|
| 2,233,417 | King et al. | Mar. 4, 1941 |
| 2,260,870 | Ruskin | Oct. 28, 1941 |

FOREIGN PATENTS

| Number | Country | Date |
|---|---|---|
| 488,784 | Great Britain | July 13, 1938 |